3,483,227
2,5 - DISUBSTITUTED - 2 - (CARBOXYALKOXY-
   AROYL) - 6 - (CARBOXYALKOXYARYL)-3,4-DI-
   HYDRO-2H-PYRANS AND THEIR DERIVATIVES
Edward J. Cragoe, Jr., and John J. Baldwin, Lansdale,
   Pa., assignors to Merck & Co., Inc., Rahway, N.J., a
   corporation of New Jersey
No Drawing. Filed June 3, 1966, Ser. No. 554,976
                  Int. Cl. C07d 7/14
U.S. Cl. 260—345.7                              10 Claims

ABSTRACT OF THE DISCLOSURE 3,4 - dihydro - 2H - pyran products which are substituted in the 2 and 6 positions by a carboxyalkoxybenzoyl or a carboxyalkoxynaphthoyl radical and which contain as additional substituents an alkyl moiety at each of the 2 and 5 positions of the pyran ring.

The products are synthesized by either of three routes: (1) via the dimerization of the corresponding [(2 - methylenealkanoyl)aryloxy]alkanoic acid precursor; (2) by heating a suitable [(2 - secondary - aminomethylalkanoyl) aryloxy]alkanoic acid at temperatures above its melting point; or (3) via the etherification of an appropriate 2(hydroxyaroyl) - 6 - (hydroxyaryl) - 3,4 - dihydro - 2H-pyran by treatment with an haloalkanoic acid or with an ester thereof in the presence of a base. The products thus obtained have utility as antiinflammatory agents and are useful as inhibitors of lactic acid dehydrogenase.

---

This invention relates to a new class of pharmacologically active compounds which can be described generally as 2,5 - disubstituted - 2 - (carboxyalkoxyaroyl)-6 - (carboxyalkoxyaryl) - 3,4 - dihydro - 2H - pyrans and to the salt, ester and amide derivatives thereof.

Also, it is an object of this invention to describe a novel method of preparation for the instant products, their salts, esters and amides.

The products of this invention are useful as inhibitors of lactic acid dehydrogenase and, also, as anti-inflammatory agents. The metabolic process by which carbohydrates are converted to lactate is a unique feature of tumors and it has been postulated that the solution to inhibiting tumor growth lies in the discovery of an agent which will irreversibly inhibit lactic acid dehydrogenase (see B. R. Baker, Cancer Chemotherapy Reports, vol. 4: page 1; 1959). Consequently, the search for irreversible lactic acid dehydrogenase inhibitors is of especial interest and their discovery constitutes a significant contribution to man's knowledge in this area.

It has now been found that certain products of this invention, particularly the 2,5 - disubstituted - 2 - (carboxyalkoxynaphthoyl) - 6 - (carboxyalkoxynaphthyl)-3,4 - dihydro - 2H - pyrans, are especially useful in irreversibly inhibiting lactic acid dehydrogenase.

The 2,5 - disubstituted - 2 - (carboxyalkoxybenzoyl)-6 - (carboxyalkoxyphenyl) - 3,4 - dihydro - 2H - pyrans of this invention have anti-inflammatory activity and, therefore, may be used in the treatment of conditions usually associated with inflammation. Typical of the conditions against which anti-inflammatory agents are useful include, for example, burns, abrasions, cuts, etc.

The 2,5 - disubstituted - 2 - (carboxyalkoxyaroyl) - 6- (carboxyalkoxyaryl) - 3,4 - dihydro - 2H - pyrans of this invention are compounds having the following structural formula:

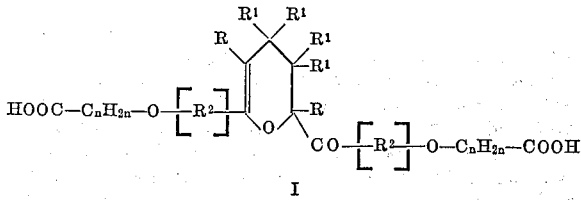

I wherein R is alkyl, for example, a lower alkyl radical, which may be either straight or branched chain or trifluoromethyl substituted alkyl, for example, trifluoromethyl lower alkyl such as 2,2,2-trifluoroethyl, etc., mononuclear aryl, for example, phenyl, mononuclear aryloxy, for example, phenoxy, mononuclear arylthioalkyl, for example, phenylthioalkyl and cycloalkyl, for example, mononuclear cycloalkyl containing from 5–6 nuclear carbon atoms such as cyclopentyl, cyclohexyl, etc.; $R^1$ is hydrogen or deuterium, $R^2$ is a phenylene radical of the formula:

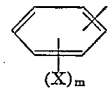

or a naphthalene radical of the formula:

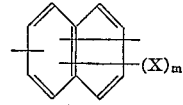

wherein X represents similar or dissimliar members selected from hydrogen, halogen, alkyl, for example, lower alkyl, alkoxy, for example, lower alkoxy and trifluoromethyl; with the proviso that there is a hydrogen atom on at least one of the carbon atoms adjacent to the point of attachment of the phenylene or naphthylene radical to the carbonyl and pyran ring, respectively; $m$ is an integer having a value of 1–2; and $n$ is an integer having a value of 1–3; and the nontoxic, pharmacologically acceptable salts, esters and amide derivatives of the foregoing carboxylic acid products.

A preferred embodiment of this invention relates to the 2,5 - diethyl - 2 - (carboxymethoxybenzoyl) - 6 - (carboxymethoxyphenyl) - 3,4 - dihydro - 2H - pyrans having the following structural formula:

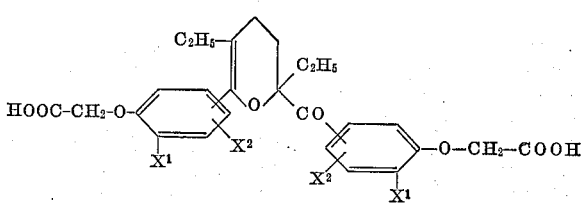

wherein $X^1$ and $X^2$ are similar or dissimilar members selected from the group consisting of hydrogen, halogen and lower alkyl; and the nontoxic, pharmacologically acceptable salts, esters and amide derivatives of the said carboxylic acid products. The foregoing class of compounds exhibits good lactic acid dehydrogenase inhibitory activity and are especially useful as anti-inflammatory agents and, therefore, constitute a preferred subgroup of compounds within this invention.

A second preferred embodiment relates to the 2,5-diethyl - 2 - (carboxymethoxynaphthoyl) - 6 - (carboxymethoxynaphthyl) - 3,4 - dihydro - 2H - pyrans having the following structural formula:

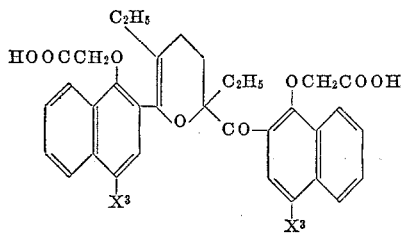

wherein $X^3$ is halogen. The foregoing class of compounds are particularly useful in irreversibly inhibiting lactic acid dehydrogenase activity and, therefore, also represent a preferred subgroup of compounds within this invention.

The products of this invention may be conveniently synthesized by any one of several alternate routes. One such method comprises dimerizing an appropriate [(2-methylene-alkanoyl)aryloxy]alkanoic acid or the corresponding ester or amide derivative thereof by heating the reactant at temperatures above its melting point. A second method comprises heating a [(2-secondary-aminomethyl-alkanoyl)aryloxy]alkanoic acid or the corresponding acid addition salt thereof at temperatures above the melting point of the reactants. A third method relates to the etherification of a 2,5-disubstituted 2-(hydroxyaroyl)-6-(hydroxyaryl)-3,4-dihydro-2H-pyran. And still another synthetic method comprises hydrolyzing an ester or amide derivative of a 2,5-disubstituted-2-(carboxyalkoxyaroyl)-6-(carboxyalkoxyaryl)-3,4-dihydro-2H-pyran to the corresponding carboxylic acid product.

The first of the aforementioned processes, that is, the dimerization process, relates specifically to heating an appropriate [(2-methylenealkanoyl)aryloxy]alkanoic acid or a suitable ester or amide derivative thereof (II, infra) at temperatures in the range of about 26–200° C. and, preferably, at temperatures in the range of 100–150° C. The reaction may be conducted in the presence, or in the absence, of a suitable solvent; however, when no solvent is used it is necessary to employ reaction temperatures which are equal to or slightly above the melting point of the starting material so as to maintain the reaction mixture in a molten form. The following equation illustrates this method of preparation:

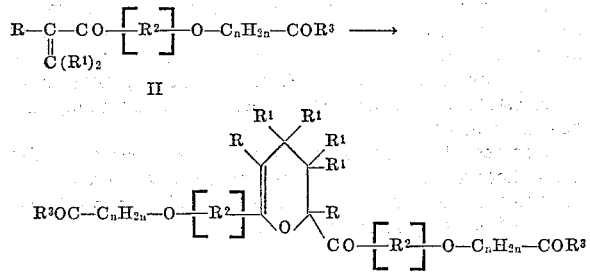

wherein R, $R^1$, $R^2$ and $n$ are as defined above and $R^3$ is hydroxy, alkoxy, amino or alkyl substituted amino. The time required for the reaction varies widely, depending to a large degree upon the temperature employed. Thus, for example, when low temperatures are used the reaction time may be in the range of 30 minutes to several months, whereas, when optimal temperatures are employed the time required is usually from 5 minutes to 24 hours.

The second method for the preparation of the instant products consists in heating a [(2-secondary-aminomethyl-alkanoyl)aryloxy]alkanoic acid, or an acid addition salt thereof, at the melting point of the reactants or, at temperatures slightly higher than their melting point as, for example, at temperatures of up to about 200° C. Also, inasmuch as the starting materials are caused to react in the molten form, no solvent is required and it is only necessary to heat the starting material at its melting point over a sufficient period. The following equation illustrates this method of preparation employing an acid addition salt of a [(2-secondary-aminomethylalkanoyl)aryloxy] alkanoic acid but, it is to be understood that the free amine could also be employed in a similar manner to yield an identical product:

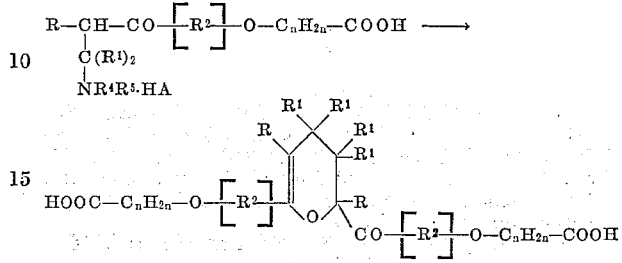

wherein R, $R^1$, $R^2$ and $n$ are as defined above and $NR^4R^5 \cdot HA$ represents the salt of a secondary amine, for example, an amine selected from the group consisting of di-lower alkylamine, piperidine, morpholine, etc., wherein HA is the acid moiety derived from an organic or inorganic acid capable of forming salts with amines, for example, hydrochloric acid, etc.

The third principal method by which the products of this invention may be obtained comprises treating a 2,5-disubstituted-2-(hydroxyaroyl)-6-(hydroxyaryl) - 3,4 - dihydro-2H-pyran (III, infra) with an haloalkanoic acid, or with an appropriate esterified derivative thereof, in the presence of a base and, when an haloalkanoic acid is employed, converting the salt of the 2,5 - disubstituted-2-(carboxyalkoxyaroyl) - 6 - (carboxyalkoxyaryl) - 3,4 - dihydro-2H-pyran thus obtained to the corresponding free acid (I, infra) by acidification of the reaction mixture. Suitable bases which may be used in the process include alkali metal carbonates such as potassium carbonate, alkali metal alkoxides such as sodium ethoxide, etc. The following equation, wherein the etherification reagent employed is an haloalkanoic acid and the basic reagent is potassium carbonate, illustrates this method of preparation; however, it is to be understood that a suitable ester of the haloalkanoic acid reactant may also be employed in an otherwise similar process and that other basic reagents such as sodium carbonate or alkali metal alkoxides may also be used:

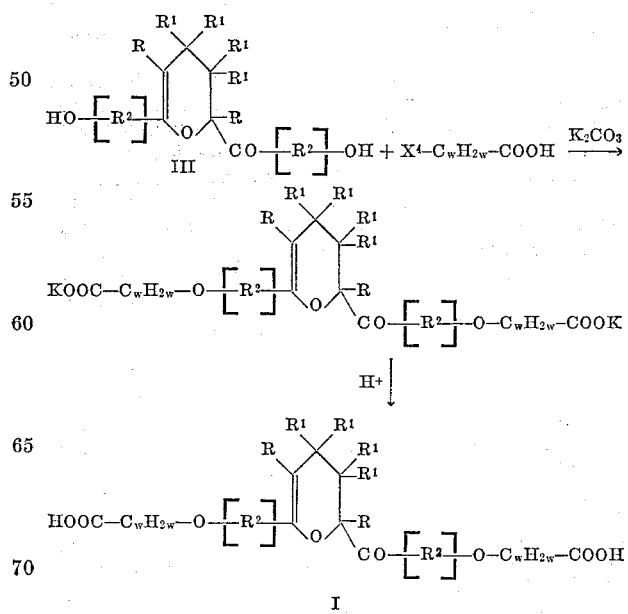

wherein R, $R^1$ and $R^2$ are as defined above; $w$ is an interger having a value of 1 to 3 and $X^4$ is halogen, for example, chlorine, bromine, iodine, etc. and $H^+$ is the cation derived from an organic or inorganic acid, for example, hydrochloric acid. The choice of a suitable reaction solvent is dependent largely upon the character of the reactants but, in general, any solvent which is substantially inert to the reactants employed and in which the reagents are reasonably soluble may be used; however, lower alkanols such as ethanol are particularly advantageous media in which to conduct the process. Also, the reaction may be conducted at ambient temperatures but, generally, it is desirable to conduct the reaction at temperatures slightly above ambient temperature.

The fourth principal method for preparing the products of this invention consists in hydrolyzing a 2-(alkoxycarbonylalkoxyaroyl) - 6 - (alkoxycarbonylalkoxyaryl)-3,4-dihydro-2H-pyran (IV, infra) or the corresponding amide derivative to the desired carboxylic acid product (I). The hydrolysis is conducted by treating the said ester or amide with an aqueous solution of a base such as an aqueous solution of sodium bicarbonate and, preferably, in the presence of an alcoholic solvent such as a lower alkanol; followed by the reaction of the carboxylate salt intermediate thus formed with an acid to obtain the desired product (I). The following equation illustrates this method of preparation:

and the acid addition salt of a secondary amine as, for example, the acid addition salt of a dialkylamine, piperidine or morpholine to yield the corresponding acid addition salt of [[2-(secondary-aminomethyl)alkanoyl]aryloxy]alkanoic acid, i.e., the corresponding salt of the Mannich amine (VI, infra); and the compound thus formed may be either isolated for use as a reactant or, alternatively, is converted directly to the corresponding [(2-methylenealkanoyl)aryloxy]alkanoic acid (IIa, infra) by decomposition as, for example, by heating the said intermediate at temperatures above room temperature in the presence of a solvent of high dielectric constant as, for example, in dimethylformamide; or, alternatively, the salt of the Mannich amine (VI) may be treated with a weak base, such as sodium bicarbonate, to obtain the corresponding free Mannich amine (VII, infra) and the amine intermediate thus obtained is either isolated for use as a starting material in the second principal method of this invention or is converted to the desired [(2-methylenealkanoyl)aryloxy]alkanoic acid (IIa) by the elimination of the secondary amino group. In some instances elimination of the secondary amino group to yield the [(2-methylenealkanoyl)aryloxy]alkanoic acid occurs at ambient temperatures but, generally, elimination is most ad-

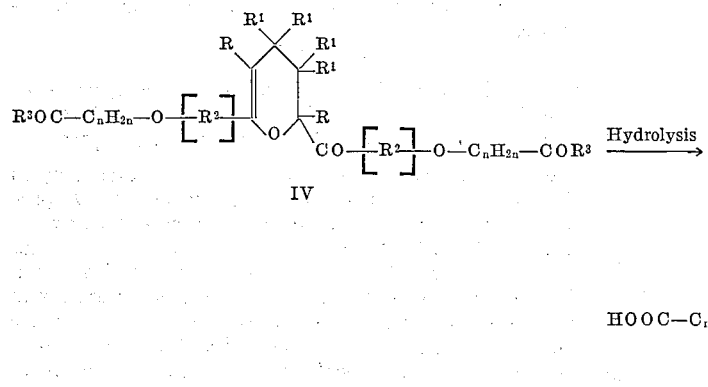

wherein R, R¹, R², R³ and n are as defined above.

The 2,5 - disubstituted-2-(carboxyalkoxyaroyl)-6-(carboxyalkoxyaryl)-3,4-dihydro-2H-pyrans (I) of this invention are generally obtained as crystalline solids and, if desired, may be purified by recrystallization from a suitable solvent. Suitable solvents include, for example, acetonitrile, butyl chloride, nitromethane, etc.

The [(2-methylenealkanoyl)aryloxy]alkanoic acids and their ester derivatives (II) and the [(2-secondary-aminomethylalkanoyl)aryloxy]alkanoic acids and their acid addition salts, which are employed as starting materials in the first two of the aforementioned preparative methods are synthesized by treating an (alkanoylaryloxy)alkanoic acid (V, infra) with formaldehyde or paraformaldehyde vantageously effected by the application of heat. The following equations illustrate these methods of preparation:

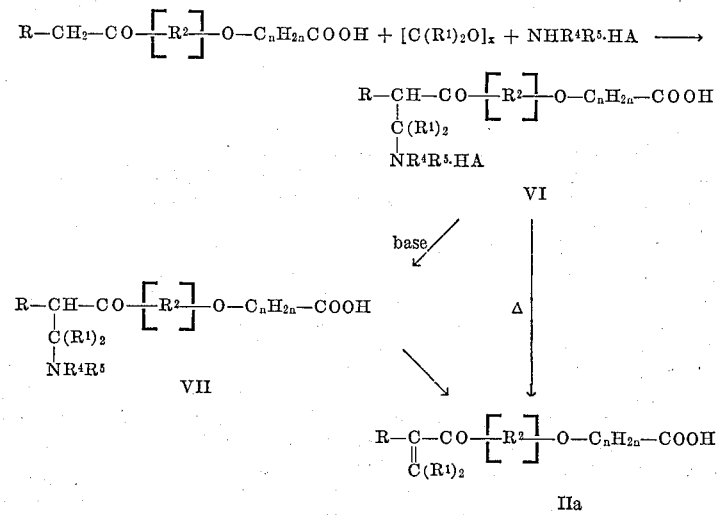

wherein R, R¹, R², n and NR⁴R⁵·HA are as defined above and x is the integer 1 or a number greater than 1. If desired, the acid product (IIa) thus obtained may be converted to its corresponding ester or amide derivative by treating the said acid with an appropriate reagent to obtain the corresponding acid halide and then treating the said acid halide with a suitable alcohol such as a lower alkanol to produce the ester derivative and with ammonia or a primary or secondary amine to yield the corresponding amide.

The foregoing methods and other methods for preparing the [(2 - methylenealkanoyl)aryloxy]alkanoic acid starting materials and their corresponding esters, amides and, also, the salts of [(2-secondary-aminomethylalkanoyl)aryloxy]alkanoic acid (VI) are described in copending application Ser. No. 155,961, filed Dec. 6, 1961, and now U.S. Patent No. 3,255,241 issued June 7, 1966, and in copending application Ser. No. 302,484, filed Aug. 15, 1963, and now U.S. Patent No. 3,255,242 issued June 7, 1966. Also, the method for the preparation of the [(2 - secondary - aminomethylalkanoyl)aryloxy]alkanoic acids and the salts thereof is disclosed in U.S. Patent No. 3,251,064, issued May 10, 1966.

The 2,5 - disubstituted - 2-(hydroxyaroyl)-6-(hydroxyaryl)-3,4-dihydro-2H-pyrans (III) which are employed as starting materials in the third principal method described above for preparing the instant products (I), i.e., the etherification process, are prepared by heating a nuclear hydroxy substituted 2 - methylenealkanophenone (VIII, infra), preferably at temperatures in excess of room temperature as, for example, at temperatures in the range of about 100–150° C. The time required for reaction completion depends largely upon the temperature employed but, in general, it can be stated that when optimal temperatures are used the time required is usually from 15 minutes to 24 hours. The following equation illustrates this method of preparation:

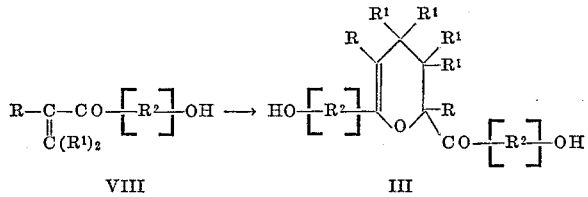

VIII        III wherein R, R¹ and R² are as defined above.

The nuclear hydroxy substituted 2-methylenealkanophenones (VIII) described above, and the method for their preparation, are described in copending application Ser. No. 361,932, filed Apr. 20, 1964, now U.S. Patent No. 3,322,832, issued May 30, 1967.

The 2-(alkoxycarbonylalkoxyaroyl)-6-(alkoxycarbonylalkoxyaryl)-3,4-dihydro - 2H - pyran reactants and amide derivatives (IV) described above in connection with the fourth principal method for preparing the instant products (I) are conveniently obtained by heating an ester or appropriate amide of a [(2-methylenealkanoyl)aryloxy]alkanoic acid according to the first principal method described above or, alternatively, by treating a 2,5-disubstituted - 2 - (hydroxyaroyl) - 6 - (hydroxyaryl) - 3,4-dihydro-2H-pyran (III) with an ester or an amide of an haloacetic or halobutyric acid according to the third principal method described above for preparing the products of this invention.

Included within the scope of this invention are the nontoxic, pharmacologically acceptable salts of the instant products (I). In general, any base which will form an acid addition salt with the 2,5-disubstituted-2-(carboxyalkoxyaryloxy) - 6 - (carboxyalkoxyaryl) - 3,4-dihydro-2H-pyrans (I) and whose pharmacological properties will not cause an adverse physiological effect when ingested by the body system is considered as being within the scope of this invention; suitable bases thus include, for example, the alkali metal and alkaline earth metal, hydroxides, carbonates, etc., ammonia, primary, secondary, and tertiary amines such as monoalkylamines, dialkylamines, trialkylamines, nitrogen containing heterocyclic amines, for example, piperidine, etc.

This invention also relates to the preparation of the ester and amide derivatives of the instant products (I) and includes all such derivatives as are compatible with the body system and whose pharmacological properties will not cause an adverse physiological effect. Esters and amides within the scope of this invention include, for example, the alkyl ester and the amide, monoalkylamide, dialkylamide and heterocyclic amide derivatives as, for example, amides derived from such heterocyclic amines as pyrrolidine, piperidine, morpholine, etc. The said ester derivatives are prepared inherently during the process according to the preparative methods described above or, alternatively, the said esters and amide derivatives may be prepared by conventional means from the corresponding 2,5-disubstituted-2-(carboxyalkoxyaroyl)-6-(carboxyalkoxyaryl)-3,4-dihydro-2H-pyran products (I) or from the acid halide derivatives thereof by treating the latter with a suitable alcohol, ammonia, monoalkylamine, dialkylamine or heterocyclic amine. Also, according to another method for preparing the amide derivatives, an ester derivative of a 2,5-disubstituted-2-(carboxyalkoxyaroyl)-6-(carboxyalkoxyaryl)-3,4-dihydro-2H - pyran (I) may be treated with ammonia, an alkylamine, dialkylamine or heterocyclic amine to produce the corresponding amide derivative.

The examples which follow illustrate the 2,5-disubstituted - 2 - (carboxyalkoxyaroyl) - 6 - (carboxyalkoxyaryl)-3,4-dihydro-2H-pyrans (I) of the invention and the methods by which they are prepared. However, the examples are illustrative only and it will be apparent to those having ordinary skill in the art that all of the products embraced by Formula I, supra, may also be prepared in an analogous manner by substituting the appropriate starting materials for those set forth in the examples.

EXAMPLE 1

2,5 - diethyl - 2 - (2,3 - dichloro - 4 - ethoxycarbonylmethoxybenzoyl) - 6 - (2,3 - dichloro - 4 - ethoxycarbonylmethoxyphenyl) - 3,4 - dihydro - 2H - pyran A one-liter flask, fitted with a reflux condenser, is charged with [2,3 - dichloro - 4-(2-methylenebutyryl)phenoxyl]-acetic acid (30.3 g., 0.10 mole), absolute ethyl alcohol (500 ml.) and boron fluoride-ethyl ether (50 g., 0.35 mole) and refluxed on a steam bath for 30 minutes. The ethyl alcohol is distilled off at reduced pressure and the viscous residual oil is poured into 300 ml. of ice water. The product is extracted with three 50 ml. portions of ether, washed with aqueous sodium bicarbonate, then washed with water and dried over sodium sulfate. The ether is distilled off at reduced pressure and the residue fractionally distilled. The distillate which boils at 181–183° C. at 0.1 mm. mercury pressure and which slowly crystallizes to a white solid melting at 43–45° C. is identified as ethyl [2,3-dichloro-4-(2-methylenebutyryl)phenoxy]acetate (15.3 g., 46%).

The undistilled material is then triturated with isopropyl alcohol to yield 8.9 g. (27%) of 2,5-diethyl-2-(2,3-dichloro - 4 - ethoxycarbonylmethoxybenzoyl)-6-(2,3-dichloro - 4 - ethoxycarbonylmethoxyphenyl) - 3,4 - dihydro-2H-pyran, a white amorphous solid, which melts at 145–147° C. after recrystallization from isopropyl alcohol.

Analysis for $C_{30}H_{32}Cl_4O_8$.—Calculated: C, 54.40; H, 4.87; Cl, 21.41. Found: C, 53.84; H, 4.92; Cl, 21.33.

EXAMPLE 2

2,5 - diethyl - 2 - (2,3 - dichloro - 4 - ethoxycarbonylmethoxybenzoyl) - 6 - (2,3 - dichloro - 4 - ethoxycarbonylmethoxyphenyl)-3,4-dihydro-2H-pyran Ethyl [2,3 - dichloro-4-(2-methylenebutyryl)phenoxy] acetate (30 g., 0.1 mole) is placed in an oven at 115° C. for three days. The product is triturated with isopropyl alcohol, filtered and dried to yield 30 g. (100%) of 2,5-diethyl - 2 - (2,3 - dichloro - 4 - ethoxycarbonylmethoxybenzoyl) - 6 - (2,3 - dichloro - 4 - ethoxycarbonylmethoxyphenyl)-3,4-dihydro-2H-pyran, M.P. 145–147° C.

EXAMPLE 3

2,5 - diethyl - 2 - (2,3 - dichloro - 4 - methoxycarbonylmethoxybenzoyl) - 6 - (2,3 - dichloro - 4 - methoxycarbonylmethoxyphenyl)-3,4-dihydro-2H-pyran By substituting methyl alcohol for the ethyl alcohol recited in Example 1 and following the procedure described therein, the distillate methyl [2,3-dichloro-4-(2-methylenebutyryl)phenoxy]acetate and the product 2,5-diethyl - 2 - (2,3 - dichloro - 4 - methoxycarbonylmethoxybenzoyl) - 6 - (2,3 - dichloro - 4 - methoxycarbonylmethoxyphenyl)-3,4-dihydro-2H-pyran, M.P. 185–187° C., are obtained.

Analysis for $C_{28}H_{28}Cl_4O_8$.—Calculated: C, 53.02; H 4.45; Cl, 22.36. Found: C, 53.30; H, 4.76; Cl, 22.45.

EXAMPLE 4

2,5 - diethyl - 2 - (2,3 - dichloro - 4 - methoxy - $d_3$ - carbonylmethoxybenzoyl) - 6 - (2,3 - dichloro - 4 - methoxy - $d_3$ - carbonylmethoxyphenyl) - 3,4 - dihydro-2H-pyran By substituting methyl-$d_3$ alcohol for the ethyl alcohol recited in Example 1 and following the procedure described therein, the distillate methyl-$d_3$ [2,3-dichloro-4-(2-methylenebutyryl)phenoxy]acetate and the product 2,5-diethyl - 2 - (2,3 - dichloro - 4 - methoxy - $d_3$ - carbonylmethoxybenzoyl) - 6 - (2,3 - dichloro - 4 - methoxy - $d_3$-carbonylmethoxyphenyl)-3,4-dihydro - 2H - pyran, M.P. 185–187° C., are obtained.

EXAMPLE 5

2,5 - diethyl - 2 - (2,3 - dichloro - 4 - ethoxycarbonylmethoxybenzoyl) - 6 - (2,3 - dichloro - 4 - ethoxycarbonylmethoxyphenyl)-3,4-dihydro-3,3,4,4-$d_4$-2H-pyran Step A: [2,3 - dichloro-4-[2-(dimethylaminomethyl-$d_2$)butyryl]phenoxy]acetic acid hydrochloride.—A mixture of (2,3-dichloro-4-butyrylphenoxy)acetic acid (35.52 g., 0.122 mole), formaldehyde-$d_2$ (4.27 g., 0.142 mole), dimethylamine hydrochloride (10.76 g., 0.132 mole) and acetic acid (0.7 ml.) is heated on a steam bath for 1½ hours.

The solid reaction mixture is ground in ether, filtered and washed with ether. The yield is 39.51 g. of a white solid having a melting point of 152–161° C. Recrystallization from a mixture of methanol-ether gives 29.00 g. (62%) of [2,3-dichloro-4-[2-(dimethylaminomethyl-$d_2$)butyryl]phenoxy]acetic acid hydrochloride in the form of a crystalline, white solid, M.P. 164–167° C.

Step B: [2,3-dichloro-4-(2-methylene-$d_2$-butyryl)phenoxy]acetic acid.—A mixture of [2,3-dichloro-4-[2-(dimethylaminomethyl-$d_2$)butyryl]phenoxy]acetic acid hydrochloride (27.92 g., 0.0722 mole) and dimethylformamide (70 ml.) is heated on a steam bath with stirring for two hours.

The hot reaction solution is poured into 1 N hydrochloric acid (350 ml.) and the mixture is then cooled to room temperature. The product is extracted with ether and the combined extracts are washed with water and dried over anhydrous magnesium sulfate. The ether is removed by distillation under reduced pressure to give 21.66 g. of white solid having a melting point of 120.5–123.5° C. Recrystallization from butyl chloride gives 19.10 g. (87%) of [2,3-dichloro-4-(2-methylene-$d_2$-butyryl)phenoxy]acetic acid in the form of a crystalline, white solid, M.P. 124–125° C.

Analysis for $C_{13}H_{10}Cl_2D_2O_4$.—Calculated: C, 51.17; H+D, 4.62. Found: C, 51.29; H+D, 4.89.

Step C: 2,5-diethyl-2-(2,3-dichloro-4-ethoxycarbonylmethoxybenzoyl) - 6 - (2,3 - dichloro - 4 - ethoxycarbonylmethoxyphenyl) - 3,4 - dihydro - 3,3,4,4 - $d_4$ - 2H - pyran.—By employing [2,3-dichloro-4-(2-methylene-$d_2$-butyryl)phenoxy]acetic acid (6.1 g., 0.02 mole), absolute alcohol (50 ml.) and boron fluoride-ethyl ether (10.0 g., 0.07 mole) and following the procedure described in Example 1, 4.7 g. of the distillate ethyl [2,3-dichloro-4-(2-methylene-$d_2$-butyryl)phenoxy]acetate and 800 mg. of the product 2,5-diethyl-2-(2,3-dichloro-4-ethoxycarbonylbenzoyl) - 6 - (2,3 - dichloro - 4 - ethoxycarbonylmethoxyphenyl)-3,4-dihydro-3,3,4,4-$d_4$-2H-pyran, M.P. 145–147° C., are obtained.

Analysis for $C_{30}H_{28}Cl_4D_4O_8$.—Calculated: C, 54.07; H+D, 5.45; Cl, 21.28. Found: C, 54.37; H+D, 5.56; Cl, 21.17.

EXAMPLE 6

2,5 - diethyl - 2-(2,3 - dimethyl - 4 - ethoxycarbonylmethoxybenzoyl) - 6 - (2,3 - dimethyl - 4 - ethoxycarbonylmethoxyphenyl)-3,4-dihydro-2H-pyran By employing [2,3-dimethyl-4-(2-methylenebutyryl)phenoxy]acetic acid (26.2 g., 0.10 mole), ethyl alcohol (250 ml.) and boron fluoride-ethyl ether (50 ml.) and following the procedure described in Example 1, 19.8 g. (68%) of the distillate ethyl [2,3-dimethyl-4-(2-methylenebutyryl)phenoxy]acetate (B.P. 166–169° C. at 0.5 mm. mercury pressure) and 1.4 g. (5%) of 2,5-diethyl-2-(2,3 - dimethyl - 4 - ethoxycarbonylmethoxybenzoyl) - 6-(2,3 - dimethyl - 4 - ethoxycarbonylmethoxyphenyl) - 3,4-dihydro-2H-pyran product, M.P. 126–128° C., are obtained.

Analysis for $C_{34}H_{44}O_8$.—Calculated: C, 70.32; H, 7.64. Found: C, 70.20; H, 7.82.

EXAMPLE 7

2,5 - diethyl - 2 - (2,3 - dichloro - 4 - carboxymethoxybenzoyl) - 6 - (2,3 - dichloro - 4 - carboxymethoxyphenyl)-3,4-dihydro-2H-pyran 2,5 - diethyl - 2 - (2,3 - dichloro - 4 - ethoxycarbonylmethoxybenzoyl) - 6 - (2,3 - dichloro - 4 - ethoxycarbonylmethoxyphenyl)-3,4-dihydro-2H-pyran (9.8 g., 0.015 mole), ethyl alcohol (750 ml.), water (400 ml.) and sodium bicarbonate (5.05 g., 0.06 mole) are refluxed for 16 hours. The ethyl alcohol is distilled off at reduced pressure and the aqueous residue is acidified with concentrated hydrochloric acid to a pH of 4. The product is extracted with ether, dried over magnesium sulfate and the ether evaporated at reduced pressure. The yield of 2,5-diethyl - 2 - (2,3 - dichloro - 4 - carboxymethoxybenzoyl)-6 - (2,3 - dichloro - 4 - carboxymethoxyphenyl) - 3,4 - dihydro-2H-pyran is 6.1 g. (67%) after recrystallization from butyl chloride, M.P. 113–115° C.; R$fs$ 40 and R$fp$ 8 (see column 14, line 51, for the definition of R$f$).

Analysis for $C_{26}H_{24}Cl_4O_8$.—Calculated: C, 51.51; H, 3.99; Cl, 23.39. Found: C, 51.45; H, 4.33; Cl, 23.19.

EXAMPLE 8

2,5-diethyl-2-(2,3-dichloro - 4 - carboxymethoxybenzoyl)-6-(2,3-dichloro - 4 - carboxymethoxyphenyl)-3,4-dihydro-2H-pyran

[2,3-dichloro - 4 - (2-methylenebutyryl)phenoxy]acetic acid (30.3 g., 0.10 mole) is placed in an oven at 125° C. for 24 hours. The product is dissolved in hot nitromethane (125 ml.,) treated with decolorizing charcoal, filtered and cooled to yield 23 g. (77%) of 2,5-diethyl-2-(2,3-dichloro - 4 - carboxymethoxybenzoyl)-6-(2,3-dichloro-4-carboxymethoxyphenyl) - 3,4 - dihydro-2H-pyran, M.P. 113–115° C.

EXAMPLE 9

2,5-diethyl - 2 - (2,4-dimethyl-5-carboxyethoxybenzoyl)-6-(2,4-dimethyl - 5 - carboxyethoxyphenyl) - 3,4-dihydro-2H-pyran By substituting 3 - [2,4 - dimethyl - 5 - (2-methylenebutyryl)phenoxy]propionic acid for the [2,3-dichloro-4-(2-methylenebutyryl)phenoxy]acetic acid recited in Example 8 and following the procedure described therein the product 2,5-diethyl-2-(2,4-dimethyl-5-carboxyethoxybenzoyl) - 6 - (2,4 - dimethyl-5-carboxyethoxyphenyl)-3,4-dihydro-2H-pyran is obtained.

EXAMPLE 10

2,5-diethyl - 2 - (2-bromo-4-carboxyethoxybenzoyl)-6-(2-bromo-4-carboxymethoxyphenyl - 3,4 - dihydro-2H-pyran By substituting [3-bromo - 4 - (2-methylenebutyryl) phenoxy]acetic acid for the [2,3-dichloro-4-(2-methylenebutyryl)phenoxy]acetic acid recited in Example 8 and following the procedure described therein the product 2,5 - diethyl - 2 - (2-bromo - 4 - carboxymethoxybenzoyl)- 6-(2-bromo - 4 - carboxymethoxyphenyl)-3,4-dihydro-2H-pyran is obtained. Upon recrystallization from nitromethane purified 2,5 - diethyl-2-(2 - bromo-4-carboxymethoxybenzoyl) - 6 - (2-bromo - 4 - carboxymethoxyphenyl)-3,4-dihydro-2H-pyran, M.P. 136–138° C., is obtained.

Analysis for $C_{26}H_{28}Br_2O_8$.—Calculated: C, 49.86; H, 4.18; Br, 25.52. Found: C, 49.69; H, 4.29; Br, 25.54.

EXAMPLE 11

2,5-diethyl - 2 - (2-iodo-4-carboxymethoxybenzoyl)-6- (2-iodo-4-carboxymethoxyphenyl) - 3,4 - dihydro-2H-pyran By substituting [3 - iodo - 4 - (2 - methylenebutyryl) phenoxy]acetic acid (1.1 g., 0.0036 mole) of the [2,3-dichloro - 4 - (2-methylenebutyryl)phenoxy]acetic acid (30.0 g., 0.10 mole) recited in Example 8 and following the procedure described therein 900 mg. (83%) of 2,5-diethyl - 2 - (2 - iodo-4-carboxymethoxybenzoyl)-6-(2-iodo-4-carboxymethoxyphenyl) - 3,4 - dihydro-2H-pyran which, upon recrystallization from nitromethane melts at 154–155° C., is obtained.

Analysis for $C_{26}H_{26}I_2O_8 \cdot \frac{1}{2}CH_3NO_2$.—Calculated: C, 42.39; H, 3.85; N, 0.97. Found: C, 42.43; H, 3.82; N, 0.86.

EXAMPLE 12

2,5-diethyl - 2 - (2,3-dimethyl-4-carboxymethoxybenzoyl)- 6-(2,3 - dimethyl - 4 - carboxymethoxyphenyl)-3,4-dihydro-2H-pyran By substituting [2,3 - dimethyl-4-(2-methylenebutyryl) phenoxy]acetic acid (5.0 g., 0.0191 mole) for the [2,3-dichloro-4-(2 - methylenebutyryl)phenoxy]acetic acid recited in Example 8 and following the procedure described therein 2.1 g. (42%) of 2,5-diethyl-2-(2,3-dimethyl-4-carboxymethoxybenzoyl) - 6 - (2,3-dimethyl - 4 - carboxymethoxyphenyl)-3,4-dihydro-2H-pyran which, upon recrystallization from nitromethane melts at 164–166° C., is obtained.

Analysis for $C_{30}H_{36}O_8$.—Calculated: C, 68.68; H, 6.92. Found: C, 67.75; H, 6.92.

EXAMPLE 13

2,5-diethyl - 2 - (2,3-dichloro-4-ethoxycarbonylmethoxybenzoyl) - 6 - (2,3-dichloro-4-ethoxycarbonylmethoxyphenyl)-3,4-dihydro-2H-pyran Step A: 2,5 - diethyl - 2 - (2,3-dichloro-4-hydroxybenzoyl)-6-(2,3 - dichloro - 4 - hydroxyphenyl)-3,4-dihydro-2H-pyran.—By substituting 2,3-dichloro - 4 - (2-methylenebutyryl)phenol (2.8 g., 0.014 mole) for the [2,3-dichloro - 4 - (2-methylenebutyryl)phenoxy]acetic acid recited in Example 8 and following the procedure described therein 1.8 g. (65%) of 2,5-diethyl-2-(2,3-dichloro-4-hydroxybenzoyl) - 6 - (2,3-dichloro-4-hydroxyphenyl)-3,4-dihydro-2H-pyran which, upon recrystallization from nitromethane melts at 197–198° C., is obtained.

Analysis for $C_{22}H_{20}Cl_4O_4$.—Calculated: C, 53.90; H, 4.11; Cl, 28.93. Found: C, 53.88; H, 4.23; Cl, 28.16.

Step B: 2,5-diethyl - 2 - (2,3-dichloro-4-ethoxycarbonylmethoxybenzoyl) - 6 - (2,3-dichloro-4-ethoxycarbonylmethoxyphenyl) - 3,4 - dihydro-2H-pyran.—A mixture of 2,5-diethyl-2-(2,3-dichloro - 4 - hydroxybenzoyl)-6-(2,3-dichloro-4-hydroxyphenyl) - 3,4 - dihydro-2H-pyran (980 mg., 0.0002 mole), anhydrous potassium carbonate (1.1 g., 0.008 mole) dimethylformamide (5 ml.) and ethyl bromoacetate (1.34 g., 0.008 mole) is heated at 60° C. for one hour and poured into 100 ml. of ice water. The 2,5-diethyl-2-(2,3-dichloro - 4 - ethoxycarbonylmethoxybenzoyl) - 6 - (2,3-dichloro-4-ethoxycarbonylmethoxyphenyl) - 3,4-dihydro-2H-pyran which separates (1.3 g., 98%) melts at 145–147° C. after recrystallization from isopropyl alcohol.

EXAMPLE 14

2,5-diethyl - 2 - (2-carboxymethoxy-5-chlorobenzoyl)-6- 2-carboxymethoxy - 5 - chlorophenyl)-2,3-dihydro-2H-pyran Step A: [2-(2-methylenebutyryl - 4 - chlorophenoxy] acetic acid.—A mixture of [2-butyryl - 4 - chlorophenoxy] acetic acid (17.5 g., 0.068 mole), paraformaldehyde (5.0 g., 0.167 mole), dimethylamine hydrochloride (25 g., 0.307 mole) and glacial acetic acid (2 ml.) is heated on a steam bath for two hours. Dimethylformamide (40 ml.) is added and the reaction mixture is heated for two hours on a steam bath and then poured into 1 N HCl (300 ml.). The product is extracted with two 200 ml. portions of ether and the ether extract is washed with water and dried over magnesium sulfate. The ether is removed by distillation at reduced pressure and the residue is recrystallized from a mixture of benzene and cyclohexane to yield 8.9 g. (48%) of [2-(2-methylenebutyryl)-4-chlorophenoxy]acetic acid, M.P. 93° C.

Analysis for $C_{13}H_{13}ClO_4$.—Calculated: C, 58.11; H, 4.88; Cl, 13.20. Found: C, 58.29; H, 4.87; Cl. 13.08.

Step B: 2,5-diethyl - 2 - (2-carboxymethoxy-5-chlorobenzoyl) - 6 - (2-carboxymethoxy-5-chlorophenyl)-3,4-dihydro-2H-pyran.—By substituting [2-(2 - methylenebutyryl) - 4 - chlorophenoxy]acetic acid (4.0 g., 0.015 mole) for the [2,3-dichloro - 4 - (2 - methylenebutyryl) phenoxy]acetic acid recited in Example 8 and following the procedure described therein 3.9 g. (97%) of 2,5-diethyl - 2 - (2-carboxymethoxy - 5 - chlorobenzoyl)-6-(2-carboxymethoxy-5-chlorophenyl) - 3,4 - dihydro-2H-pyran which, upon recrystallization from nitromethane melts at 157–159° C., is obtained.

Analysis for $C_{26}H_{26}Cl_2O_8$.—Calculated: C, 58.11; H, 4.88; Cl, 13.20. Found: C, 57.90; H, 4.86; Cl. 13.29.

EXAMPLE 15

2,5 - diethyl - 2 - (2,3 - dichloro - 4 - ethoxycarbonylmethoxybenzoyl) - 6 - (2,3 - dichloro - 4 - ethoxycarbonylmethoxyphenyl)-3,4-dihydro-2H-pyran A mixture of 2,5-diethyl-2-(2,3 - dichloro - 4 - carboxymethoxybenzoyl) - 6 - (2,3 - dichloro - 4 - carboxymethoxyphenyl) - 3,4 - dihydro - 2H - pyran (3.03 g., 0.005 mole), thionyl chloride (1.44 ml., 0.02 mole) and benzene (30 ml.) is heated at reflux under anhydrous conditions for one hour. The excess thionyl chloride and benzene are distilled at reduced pressure and then benzene (50 ml.) is added and the mixture is distilled again at reduced pressure. To the residual 2,5 diethyl-2-(2,3-dichloro - 4 - chlorocarbonylmethoxybenzoyl) - 6 - (2,3-dichloro - 4 - chlorocarbonylmethoxyphenyl) - 3,4 - dihydro-2H-pyran thus obtained 50 ml. of ethanol is added. Upon standing for one hour there is deposited 2.4 g. (73%) of 2,5-diethyl-2-(2,3-dichloro-4-ethoxycarbonylmethoxybenzoyl)-6-(2,3-dichloro - 4 - ethoxycarbonylmethoxyphenyl)-3,4-dihydro-2H-pyran, M.P. 145–147° C.

EXAMPLE 16

2,5 - diethyl - 2 - (1 - carboxymethoxy - 4 - chloro - 2-naphthoyl) - 6 - (1 - carboxymethoxy - 4 - chloro - 2-naphthyl)-3,4-dihydro-2H-pyran

[4 - chloro - 2 - (2 - methylenebutyryl) - 1 - naphthyloxy]acetic acid (13.0 g., 0.041 mole) is heated at 105° C. for a period of from 48–65 hours. The resulting glass is then triturated with n-butyl chloride to yield 8.3 g. (63.8%) of product which melts at 189–191.5° C.

Upon recrystallization from acetonitrile the 2,5-diethyl - 2 - (1 - carboxymethoxy - 4 - chloro - 2 - naphthoyl) - 6 - (1 - carboxymethoxy - 4 - chloro - 2-naphthyl)-3,4-dihydro-2H-pyran thus obtained melts at 192–194° C.

Analysis for $C_{34}H_{30}Cl_2O_8$.—Calculated: C, 64.05; H, 4.74. Found: C, 63.99; H, 4.70. Mol. wt.: Calculated 637.49; found, 609.15.

EXAMPLE 17

2,5-diethyl-2-(1-carboxymethoxy-2-naphthoyl)-6-(1-carboxymethoxy-2-naphthyl)-3,4-dihydro-2H-pyran

[2 - (2 - methylenebutyryl) - 1 - naphthyloxy]acetic acid (1.0 g.) is heated at 100° C. for seven days. The resulting glass is then triturated with n-butyl chloride to yield 150 mg. (30%) of product.

Upon recrystallization from acetonitrile the 2,5-diethyl-2 - (1 - carboxymethoxy - 2 - naphthoyl) - 6 - (1 - carboxymethoxy - 2 - naphthyl) - 3,4 - dihydro - 2H - pyran thus obtained melts at 190–192° C.

Analysis for $C_{34}H_{32}O_8$.—Calculated: C, 71.82; H, 5.67. Found: C, 71.56; H, 5.88. Mol. wt.: Calculated, 568.6; found, 574.16.

EXAMPLE 18

2,5-diethyl-2-(2-carboxymethoxy-5-naphthoyl)-6-(2-carboxymethoxy-5-naphthyl)-3,4-dihydro-2H-pyran

[5 - (2 - methylenebutyryl) - 2 - naphthyloxy]acetic acid (0.5 g., 0.002 mole) is heated at 135° C. for 17 hours. The glass thus obtained is then triturated with n-butyl chloride to yield 0.4 g. (80%) of 2,5-diethyl-2-(2 - carboxymethoxy - 5 - naphthoyl) - 6 - (2 - carboxymethoxy-5-naphthyl)-3,4-dihydro-2H-pyran.

Upon recrystallization from nitromethane and from acetonitrile there is thus obtained 125 mg. (25%) of 2,5-diethyl - 2 - (2 - carboxymethoxy - 5 - naphthoyl) - 6 - (2-carboxymethoxy - 5 - napthyl) - 3,4 - dihydro - 2H - pyran, M.P. 203.5–205.5° C.

Analysis for $C_{34}H_{32}O_8$.—Calculated: C, 71.82; H, 5.67. Found: C, 71.56; H, 5.75. Mol. wt.: Calculated, 568,6; found, 596.5.

EXAMPLE 19

2,5-diethyl-2-(1-carboxymethoxy-6-naphthoyl)-6-(1-carboxymethoxy-6-naphthyl)-3,4-dihydro-2H-pyran

[6 - (2 - methylenebutyryl) - 1 - naphthyloxy]acetic acid (0.5 g. 0.002 mole) is heated at 135° C. for 17 hours. The glass thus obtained is then triturated with acetonitrile to yield 150 mg. (30%) of 2,5-diethyl-2-(1-carboxymethoxy-6-naphthoyl) - 6 - (1 - carboxymethoxy-6-naphthyl)-3,4-dihydro-2H-pyran.

Upon recrystallization from acetonitrile the 2,5-diethyl-2 - (1 - carboxymethoxy - 6 - naphthoyl) - 6 - (1 - carboxymethoxy - 6 - naphthyl) - 3,4 - dihydro - 2H - pyran melts at 212–213° C.

Analysis for $C_{34}H_{32}O_8$.—Calculated: C, 71.82; H, 5.67. Found: C, 72.27; H, 5.67. Mol. wt.: Calculated, 568.6; found, 568.4.

EXAMPLE 20

2,5 - diethyl - 2 - (2,3 - dichloro - 4 - carboxymethoxybenzoyl) - 6 - (2,3 - dichloro - 4 - carboxymethoxyphenyl)-3,4-dihydro-2H-pyran

[2,3 - dichloro - 4 - (2 - dimethylaminomethylbutyryl) phenoxy]acetic acid hydrochloride (3.85 g., 0.01 mole) is placed in a reaction vessel and heated at 200° C. for three hours. The product is dissolved in chloroform (50 ml.), washed well with water and dried over magnesium sulfate. After distillation of the chloroform at reduced pressure, the product is recrystallized from nitromethane to yield 2,5-diethyl-2-(2,3-dichloro - 4 - carboxymethoxybenzoyl) - 6 - (2,3 - dichloro - 4 - carboxymethoxyphenyl)-3,4-dihydro-2H-pyran having a melting point of 113–115° C.

EXAMPLE 21

2,5 - diethyl - 2 - (3 - trifluoromethyl - 4 - carboxymethoxybenzoyl) - 6 - (3 - trifluoromethyl - 4 - carboxymethoxyphenyl)-3,4-dihydro-2H-pyran By substituting [3 - trifluoromethyl - 4 - [2 - (dimethylaminomethyl)butyryl]phenoxy]acetic acid hydrochloride for the [2,3-dichloro-4-(2-dimethylaminomethylbutyryl)phenoxy]acetic acid hydrochloride of Example 20 and following the procedure described therein, the product 2,5 - diethyl - 2 - (3 - trifluoromethyl-4-carboxymethoxybenzoyl) - 6 - (3 - trifluoromethyl - 4 - carboxymethoxyphenyl)-3,4-dihydro-2H-pyran is obtained.

EXAMPLE 21A 2,5 - diethyl - 2 - [2,3 - dichloro - 4 - (2 - ethoxyethoxycarbonyl)methoxybenzoyl] - 6 - [2,3 - dichloro - 4 - (2-ethoxyethoxycarbonyl)methoxyphenyl] - 3,4 - dihydro-2H-pyran By substituting 2-ethoxyethanol for the ethanol recited in Example 15 and following substantially the procedure described therein the product 2,5-diethyl-2-[2,3-dichloro-4 - (2 - ethoxyethoxycarbonyl)methoxybenzoyl] - 6 - [2,3-dichloro - 4 - [2 - ethoxyethoxycarbonyl)methoxyphenyl]-3,4-dihydro-2H-pyran is obtained.

In a manner similar to that described in Example 8, supra, for the preparation of 2,5-diethyl-2-(2,3-dichloro-4 - carboxymethoxybenzoyl) - 6 - (2,3 - dichloro - 4 - carboxymethoxyphenyl) - 3,4 - dihydro - 2H - pyran, other 2,5 - disubstituted - 2 - (carboxyalkoxybenzoyl)-6-(carboxyalkoxyphenyl) - 3,4 - dihydro - 2H - pyrans (I) of this invention may be obtained. Thus, by substituting the appropriate [4 - (2 - methylenealkanoyl)phenoxy]-alkanoic acid for the [2,3-dichloro-4-(2-methylenebutyryl)phenoxy]acetic acid of Example 8 and following substantially the procedure described therein, other corresponding 2,5 - disubstituted - 2 - (carboxyalkoxybenzoyl)-6-(carboxyalkoxyphenyl)-3,4-dihydro-2H-pyran products (Ia, infra) may be synthesized. The following equation illustrates the reaction of Example 8 and, together with Table I (infra), depict the [4-(2-methylenealkanoyl)-phenoxy]alkanoic acid starting materials (IIb, infra) of the process and the corresponding products (Ia, infra) obtained therefrom. In the last two columns of Table I are listed the Rƒ values (multiplied by 100) for both the [4-(2 - methylenealkanoyl)phenoxy]alkanoic acid starting materials and the corresponding 2,5-disubstituted-2-(carboxyalkoxybenzoyl) - 6 - (carboxyalkoxyphenyl) - 3,4 - dihydro - 2H - pyran products (Ia). The Rƒ values were obtained on 250 micron fluorescent silica, thin-layer chromatographic plates developed with a mixture of benzene, dioxane and acetic acid (25:5:1). The abbreviation Rƒs is a ratio which is obtained by dividing the distance traveled by the starting material (IIb, infra) by the distance simultaneously traveled by the developer; and the abbreviation Rƒp represents the corresponding ratio for the final product (Ia). A discussion of chromatographic Rƒ values appears in the text: "Chromotography," by E. Heftmann; page 101, 1961; Reinhold Publishing Corporation, New York.

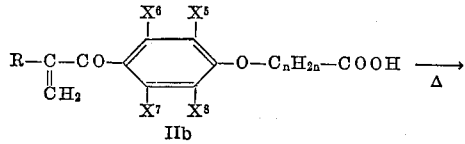

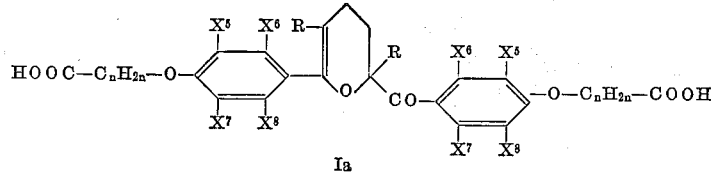

TABLE I

| Example | R | $X^5$ | $X^6$ | $X^7$ | $X^8$ | $-C_nH_{2n}-$ | Rfs | Rfp |
|---|---|---|---|---|---|---|---|---|
| 22 | $-C_2H_5$ | H | $-OCH_3$ | H | H | $-CH_2-$ | 44 | 11 |
| 23 | $-C_2H_5$ | Cl | H | Cl | H | $-CH_2-$ | 58 | 21 |
| 24 | $-O-\phenyl$ | H | $-CH_3$ | H | H | $-CH_2-$ | 58 | 36 |
| 25 | $-(CH_2)_2-S-\phenyl$ | H | $-CH_3$ | H | H | $-CH_2-$ | 58 | 17 |
| 26 | $-\text{thienyl}$ | H | Cl | H | H | $-CH_2-$ | 56 | 16 |
| 27 | $-\text{cyclopentyl}$ | H | Cl | H | H | $-CH_2-$ | 42 | 7 |
| 28 | $-CH(CH_3)_2$ | Cl | Cl | H | H | $-CH_2-$ | 54 | 7 |
| 29 | $-C_2H_5$ | Cl | H | H | Cl | $-CH_2-$ | 64 | 16 |
| 30 | $-C_2H_5$ | $-CH_3$ | H | H | $-CH_3$ | $-CH_2-$ | 54 | 13 |

It will be apparent from the foregoing description that the 2,5 - disubstituted - 2 - (carboxyalkoxyaroyl) - 6 - (carboxyalkoxyaryl) - 3,4 - dihydro - 2H - pyrans (I) of this invention constitute a valuable class of compounds which have not been prepared heretofore. One skilled in the art will also appreciate that the processes disclosed in the above examples are merely illustrative and are capable of a wide variation and modification without departing from the spirit of this invention.

What is claimed is:

1. A compound having the formula:

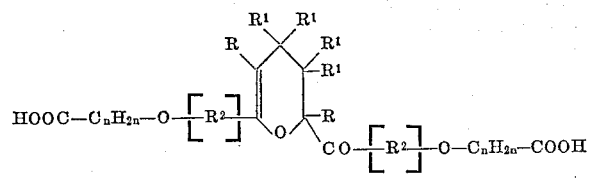

wherein R is lower alkyl, trifluoromethyl substituted lower alkyl, mononuclear carbocyclic aryl, mononuclear carbocyclic aryloxy, mononuclear carbocyclic arylthio lower alkyl and lower cycloalkyl; $R^1$ is hydrogen or deuterium; $R^2$ is a phenylene radical of the formula:

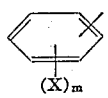

or a naphthylene radical of the formula:

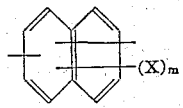

wherein X represents similar or dissimilar members selected from hydrogen, halogen, lower alkyl, lower alkoxy and trifluoromethyl, with the proviso that there is a hydrogen atom on at least one of the carbon atoms adjacent to the point of attachment of the phenylene or naphthylene radical to the carbonyl and pyran ring, respectively; $m$ is an integer having a value of 1-2; and $n$ is an integer having a value of 1-3; and the nontoxic, pharmacologically acceptable salts, lower alkyl esters, ethoxyethyl esters and amide, mono-lower alkylamide, di-lower alkylamide, pyrrolidide, piperidide and morpholide derivatives thereof.

2. A compound according to claim 1 having the following formula:

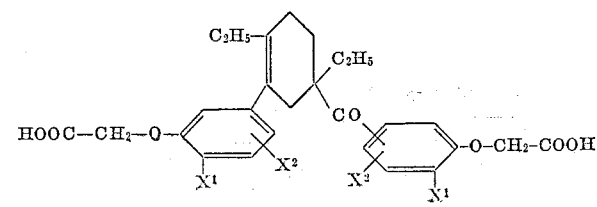

wherein $X^1$ and $X^2$ are similar or dissimilar members selected from hydrogen, halogen and lower alkyl; and the nontoxic, pharmacologically acceptable salts, lower alkyl esters, ethoxyethyl esters and amide, mono-lower alkylamide, di-lower alkylamide, pyrrolidide, piperidide and morpholide derivatives thereof.

3. The product of claim 2 wherein $X^1$ is halogen and $X^2$ is halogen.

4. 2,5 - diethyl-2-(2,3-dichloro-4-ethoxycarbonylmethoxybenzoyl)-6-(2,3 - dichloro-4-ethoxycarbonylmethoxyphenyl)-3,4-dihydro-2H-pyran.

5. 2,5-diethyl - 2 - (2,3-dichloro-4-carboxymethoxybenzoyl)-6-(2,3 - dichloro-4-carboxymethoxyphenyl) - 3,4 - dihydro-2H-pyran.

6. The product of claim 2 wherein $X^1$ is lower alkyl and $X^2$ is lower alkyl.

7. The product of claim 2 wherein $X^1$ is hydrogen and $X^2$ is halogen.

8. A compound according to claim 1 having the following formula:

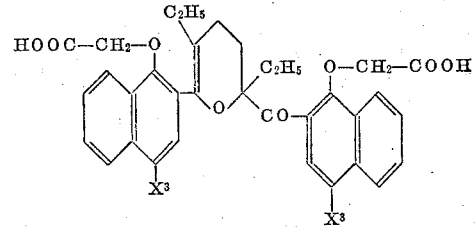

wherein $X^3$ is halogen; and the nontoxic, pharmacologically acceptable salts, lower alkyl esters, ethoxyethyl esters and amide, mono-lower alkylamide, di-lower alkylamide, pyrrolidide, piperidide and morpholide derivatives thereof.

9. The product of claim 8 wherein $X^3$ is chlorine.

10. The product of claim 8 wherein $X^3$ is hydrogen.

References Cited

UNITED STATES PATENTS

| | | | |
|---|---|---|---|
| 2,454,351 | 11/1948 | Sowa et al. | 260—345.7 XR |
| 3,168,534 | 2/1965 | Payne | 260—345.7 |
| 3,256,276 | 6/1966 | Grogan | 260—345.7 XR |
| 3,312,730 | 4/1967 | Winter et al. | 260—345.7 XR |

OTHER REFERENCES

Howell et al.: J. Chem. Soc. (London), pp. 293–4 (1937). QD1.C6.

Paul et al.: Bull. Soc. Chim. (France), pp. 672–8 (1954). QD1.S4.

HENRY R. JILES, Primary Examiner

J. M. FORD, Assistant Examiner

U.S. Cl. X.R.

260—345.8, 345.9, 518, 520, 521